(12) United States Patent
Leitzsch et al.

(10) Patent No.: US 9,335,506 B2
(45) Date of Patent: May 10, 2016

(54) TRANSLATIONAL OPTIC ALIGNMENT LOCKING DEVICE

(71) Applicant: EXELIS, INC., Mclean, VA (US)

(72) Inventors: Christopher Leitzsch, Roanoke, VA (US); William Eric Garris, Salem, VA (US); Nestor Beach, Salem, VA (US); William Smith, Daleville, VA (US)

(73) Assignee: Exelis, Inc., McLean, VA (US)

( * ) Notice: Subject to any disclaimer, the term of this patent is extended or adjusted under 35 U.S.C. 154(b) by 123 days.

(21) Appl. No.: 13/785,490

(22) Filed: Mar. 5, 2013

(65) Prior Publication Data

US 2014/0254033 A1    Sep. 11, 2014

(51) Int. Cl.
| G02B 7/02 | (2006.01) |
| G02B 7/04 | (2006.01) |
| G02B 7/00 | (2006.01) |
| G02B 23/12 | (2006.01) |

(52) U.S. Cl.
CPC ............. G02B 7/021 (2013.01); G02B 7/003 (2013.01); G02B 7/023 (2013.01); G02B 7/026 (2013.01); G02B 23/12 (2013.01); *G02B 7/02* (2013.01); *G02B 7/04* (2013.01)

(58) Field of Classification Search
CPC . G02B 7/003; G02B 7/02–7/028; G02B 4/06; G02B 23/145
USPC .......................... 359/425, 694–706, 811–830
See application file for complete search history.

(56) References Cited

U.S. PATENT DOCUMENTS

| 2,479,789 | A | * | 8/1949 | Street | G02B 27/36 |
| | | | | | 33/298 |
| 3,297,389 | A | * | 1/1967 | Gibson | G02B 23/14 |
| | | | | | 359/424 |
| 4,139,268 | A | * | 2/1979 | Litman | G02B 7/10 |
| | | | | | 359/825 |
| 4,373,269 | A | * | 2/1983 | Doliber | F41G 1/38 |
| | | | | | 359/429 |
| 4,643,542 | A | * | 2/1987 | Gibson | F41G 1/38 |
| | | | | | 359/424 |
| 4,740,065 | A | | 4/1988 | Aoyagi | |
| 4,998,811 | A | * | 3/1991 | Basta | F41G 1/38 |
| | | | | | 359/422 |
| 5,463,495 | A | * | 10/1995 | Murg | F41G 1/38 |
| | | | | | 359/399 |

(Continued)

FOREIGN PATENT DOCUMENTS

FR        2 428 852 A1    1/1980

OTHER PUBLICATIONS

International Search Report and Writen Opinion of Corresponding International Patent Application No. PCT/US2014/020247, Issued Jun. 5, 2014.

*Primary Examiner* — Thomas K Pham
*Assistant Examiner* — Nicholas R Pasko
(74) *Attorney, Agent, or Firm* — RatnerPrestia

(57) ABSTRACT

An optical device includes a housing enclosure, a lens cell holder mounted to the housing enclosure by a retainer, a lens assembly mounted to the lens cell holder such that the lens assembly is configured to translate in an axial direction; and a radial space defined between the lens cell holder and the retainer that is sized to accommodate adjustment of the lens cell holder and the lens assembly in a radial direction with respect to the housing enclosure. A method of adjusting a line of sight of the optical device includes (i) positioning the lens assembly against the housing enclosure; (ii) adjusting the radial position of the lens assembly until a pre-determined line of sight requirement is achieved; and (iii) fixing the lens assembly to the housing enclosure of the optical device to preserve the radial position of the lens assembly with respect to the housing enclosure.

13 Claims, 4 Drawing Sheets

(56) References Cited

U.S. PATENT DOCUMENTS

| | | | | |
|---|---|---|---|---|
| 6,005,711 A * | 12/1999 | Mai | ............. | G02B 7/10 |
| | | | | 359/399 |
| 6,204,979 B1 * | 3/2001 | Matsui | ............. | G02B 7/023 |
| | | | | 359/694 |
| 6,262,853 B1 * | 7/2001 | Takanashi | ............. | G02B 7/005 |
| | | | | 359/703 |
| 6,515,806 B2 * | 2/2003 | Denpo | ............. | G02B 7/14 |
| | | | | 359/694 |
| 6,816,305 B2 * | 11/2004 | Regan | ............. | F41G 1/38 |
| | | | | 359/399 |
| 7,397,617 B2 * | 7/2008 | Floyd | ............. | G02B 23/12 |
| | | | | 359/811 |
| 7,514,664 B2 * | 4/2009 | Moody | ............. | G02B 23/12 |
| | | | | 250/207 |
| 7,626,760 B2 * | 12/2009 | Wu | ............. | G02B 7/04 |
| | | | | 359/426 |
| 7,738,782 B2 * | 6/2010 | Kogure | ............. | G02B 7/10 |
| | | | | 359/825 |
| 7,827,723 B1 | 11/2010 | Zaderey et al. | | |
| 8,102,611 B2 * | 1/2012 | Neff | ............. | G02B 7/021 |
| | | | | 359/822 |
| 8,120,845 B2 * | 2/2012 | Brown | ............. | G02B 7/004 |
| | | | | 359/399 |
| 2001/0019459 A1 | 9/2001 | Denpo | | |
| 2007/0103796 A1 | 5/2007 | Floyd et al. | | |
| 2013/0276345 A1 * | 10/2013 | Hamilton | ............. | F41G 1/38 |
| | | | | 42/119 |

* cited by examiner

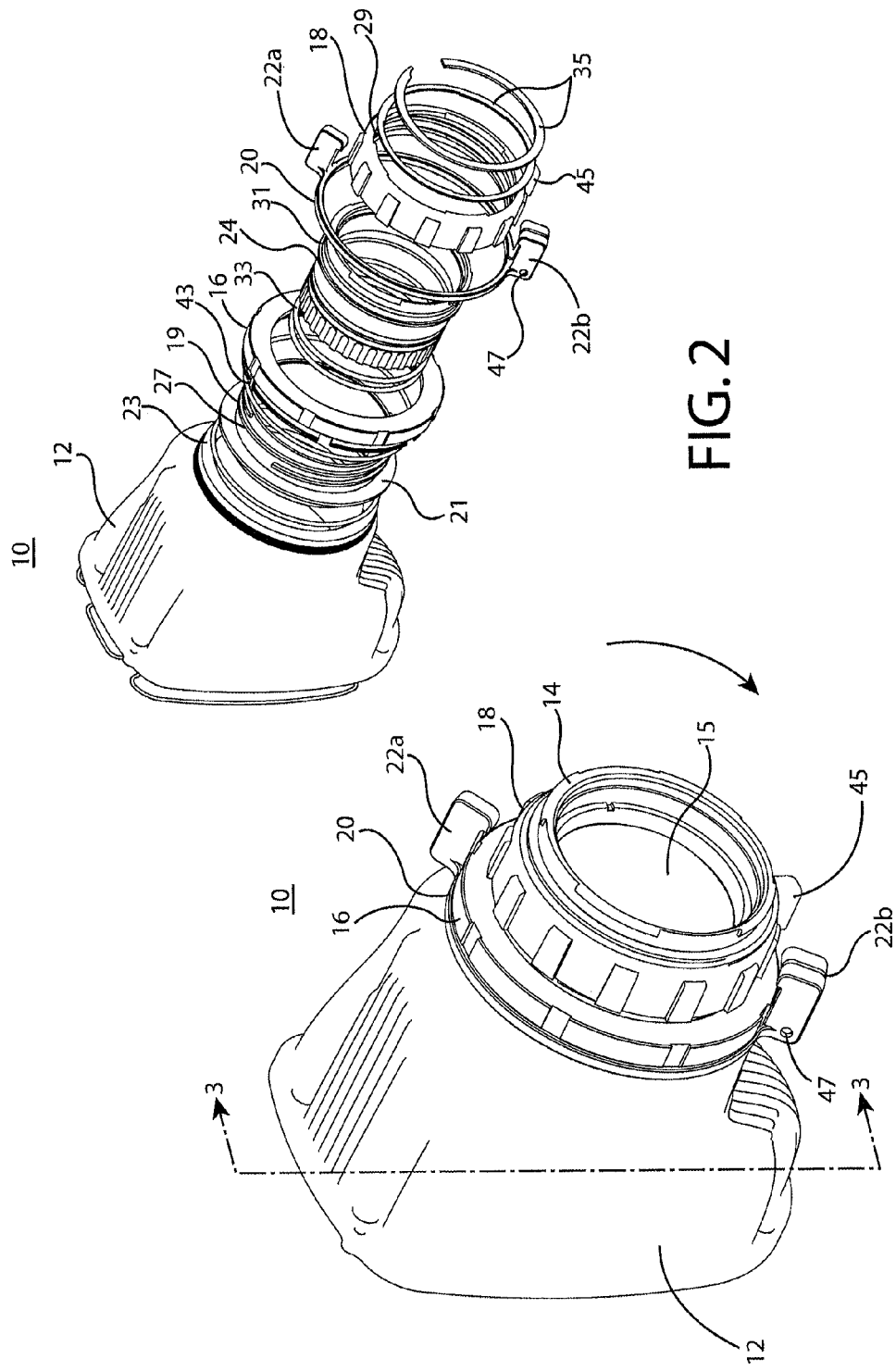

TRANSLATIONAL OPTIC ALIGNMENT LOCKING DEVICE

FIELD OF THE INVENTION

The present invention is directed to a device and method of mounting a translatable lens assembly of an optical device to a housing of the optical device.

BACKGROUND OF THE INVENTION

Optical devices typically include a lens assembly including one or more lenses that are capable of translation and/or rotation within a larger housing in order to adjust the focus setting of the optical device. Described herein is a device and method of mounting the lens assembly to the housing.

SUMMARY OF THE INVENTION

According to one aspect of the invention and referring generally to the figures, an optical device 10 comprises a housing enclosure 12; a lens cell holder 19 that is mounted to the housing enclosure 12 by a retainer 16; a lens assembly 14 having one or more lenses 15 that is mounted to the lens cell holder 19 such that the lens assembly 14 is configured to translate in an axial direction with respect to the housing enclosure 12 and the lens cell holder 19; and a radial space 50 defined between the lens cell holder 19 and the retainer 16 that is sized to accommodate adjustment of the lens cell holder 19 and the lens assembly 14 in a radial direction with respect to the housing enclosure 12 prior to fastening the retainer 16 to the housing enclosure 12 in order to adjust a line of sight of the optical device 10.

According to another aspect of the invention, a method of adjusting a line of sight of the optical device 10 comprises the steps of: positioning a lens assembly 14 having one or more lenses 15 in a lens cell holder 19; positioning the lens cell holder 19 against a housing enclosure 12 of the optical device 10; adjusting a radial position of the lens cell holder 19 with respect to the housing enclosure 12 until a pre-determined line of sight requirement is achieved; and fixing the lens cell holder 19 to the housing enclosure 12 using a retainer 16 to preserve the radial position of the lens assembly 14 with respect to the housing enclosure 12.

BRIEF DESCRIPTION OF THE DRAWINGS

The invention is best understood from the following detailed description when read in connection with the accompanying drawings, with like elements having the same reference numerals. Included in the drawings are the following figures:

FIG. 1 depicts a rear perspective view of an optical device according to one exemplary embodiment of the invention.

FIG. 2 depicts an exploded view of the optical device of FIG. 1.

DETAILED DESCRIPTION OF THE INVENTION

Figure 3:
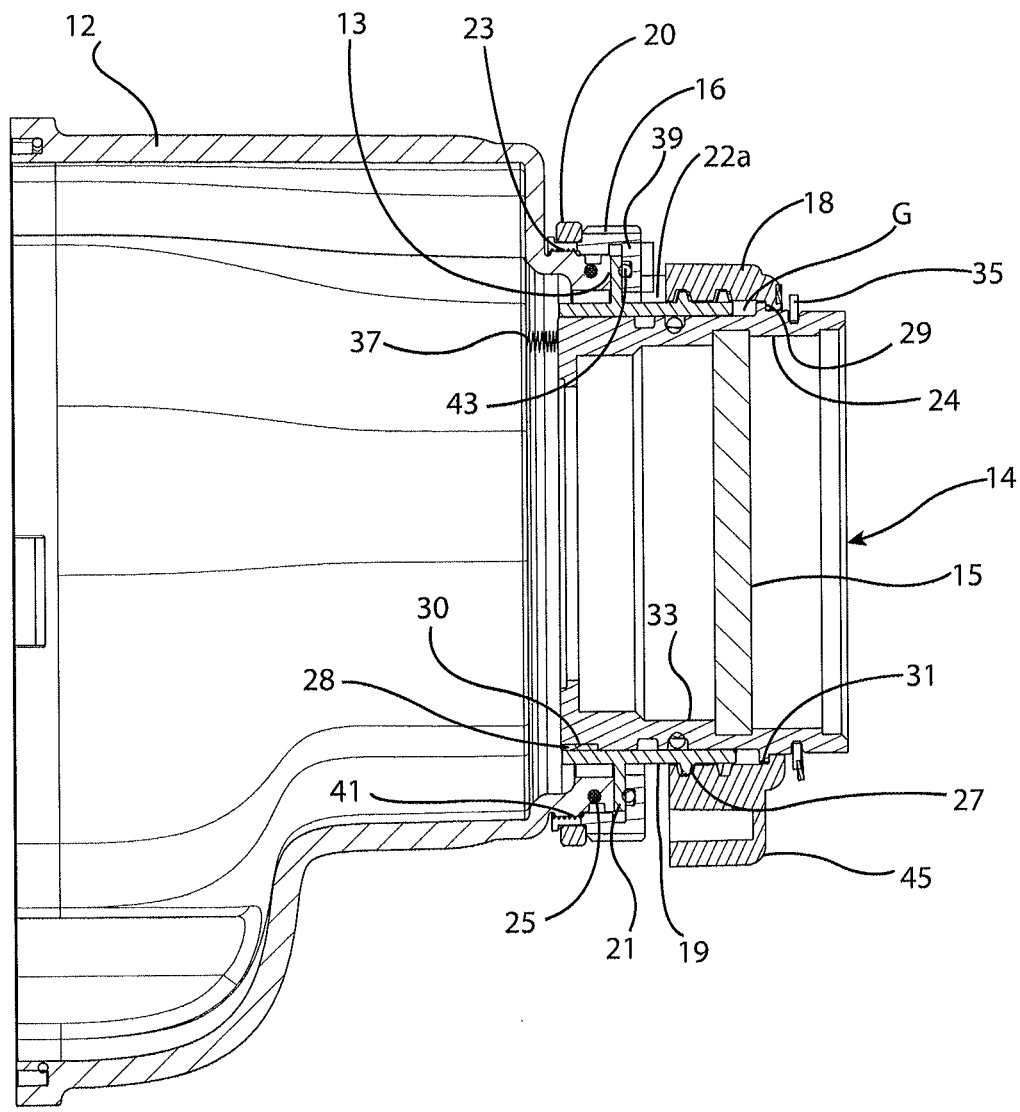
FIG. 3 depicts a cross-sectional view of the optical device of FIG. 1 taken along the lines 3-3 in FIG. 1.

FIGS. 1-3 depict an optical device 10, according to one exemplary embodiment of the invention. According to the exemplary embodiment shown in the figures, the optical device 10 is a night vision monocular. However, it should be understood that the optical device 10 may be any type of optical device such as a monocular, binocular, camera, microscope, telescope, for example. The optical device 10 may have night vision capabilities, image intensification, thermal imaging, etc.

Referring to the overall features of the optical device 10, the optical device 10 generally includes a housing enclosure 12 in which optical components (not shown) are positioned. An eyepiece lens assembly 14 having one or more lenses 15 is moveably mounted with respect to the housing enclosure 12. A lens cell holder 19, in which the lens assembly 14 translates, is fixedly mounted to the housing enclosure 12 by a retaining ring 16. A diopter focus ring 18 is rotatably mounted to both the lens cell holder 19 and the lens assembly 14 for adjusting the axial position of the lens assembly 14 relative to the housing enclosure 12. A diopter stop ring 20 is positioned on the retaining ring 16 and is configured to limit rotation of the diopter focus ring 18 in both clockwise and counterclockwise directions.

Referring now to the individual components of the optical device 10, the housing enclosure 12 includes an interior region in which optical components (not shown) are positioned. The optical components may be related to image intensification, thermal imaging, image processing, etc. The housing enclosure 12 includes a circumferential flange 13 at a proximal end thereof. Mechanical threads 23 are defined on the outer surface of the flange 13. An O-ring 25 is mounted on the exterior surface of the flange 13 at a location that is proximal of the mechanical threads 23. The O-ring 25 is intended to limit the entrance of contaminants into the interior of the housing enclosure 12.

The lens cell holder 19 of the optical device 10 has a cylindrically-shaped hollow body defining an interior surface upon which the eyepiece lens assembly 14 translates in an axial direction. The interior surface of the lens cell holder 19 includes a rib 28 that extends in an radial direction toward the central axis of the optical device 10. The rib 28 extends only a small portion about the inner circumference of the lens cell holder 19. The rib 28 is positioned in a complimentary recess 30 that is formed on the outer surface of the lens housing 24. Engagement between the rib 28 and the recess 30 prevents the lens housing 24 from rotating with respect to the lens cell holder 19 as the eyepiece lens assembly 14 translates along the inner revolved surface of the lens cell holder 19.

The exterior surface of the lens cell holder 19 includes a flange 21 and mechanical threads 27 that are defined at a location that is proximal of the flange 21. In an assembled form of the optical device 10, the flange 21 is sandwiched between the retaining ring 16 and the flange 13 of the housing enclosure 12, thereby fixedly mounting the lens cell holder 19 to the housing enclosure 12. The mechanical threads 27 are engaged with mechanical threads on the diopter focus ring 18, such that the diopter focus ring 18 is capable of rotating along the threaded surface of the lens cell holder 19. The lens cell holder 19 is incapable of rotation or translation with respect to the housing enclosure 12 once the retaining ring 16 is securely fastened to the housing enclosure 12.

The eyepiece lens assembly 14 of the optical device 10 is positioned before an end-user's eye in practice. The eyepiece lens assembly 14 includes a cylindrically-shaped lens housing 24 in which one or more lenses 15 (shown schematically) are fixedly positioned. The housing 24 has a cylindrically-shaped hollow body defining an interior surface upon which the one or more lenses 15 are mounted.

An annular flange 31 is defined on the proximal end of the exterior facing surface of the housing 24. As will be described with reference to FIGS. 6 and 7, a flange 29 of the diopter focus ring 18 bears on the proximal end of the flange 31 of the housing 24. Rotation of the focus ring 18 on the mechanical threads 27 of the lens cell holder 19 in a clockwise direction (see clockwise directional arrow in FIG. 1) causes the flange 29 of the focus ring 18 to bear on the flange 31 of the lens housing 24 and translate the eyepiece lens assembly 14 in a distal direction (i.e., toward the housing enclosure 12) along the x-axis.

An O-ring 33 is positioned in a circumferential recess that is defined on the exterior surface of the housing 24. The O-ring 33 limits the passage of contaminants at the interface between the lens cell holder 19 and the lens assembly 14.

Two annular rings 35 are positioned in a circumferential recess that is formed on the exterior surface of the housing 24 at a location that is proximal of the flange 31. The rings 35 are provided to prevent the inadvertent removal of the diopter focus ring 18 from the optical device 10 if the diopter focus ring 18 were to be continuously rotated in a counter-clockwise direction.

Referring still to the individual components of the optical device 10 that are shown in FIGS. 1-3, a compression spring 37, which is shown schematically in the figures, is positioned between the housing enclosure 12 and the lens housing 24 to urge the entire eyepiece lens assembly 14 in the proximal direction away from the housing enclosure 12. The spring 37 is positioned to urge the entire eyepiece lens assembly 14 in a proximal direction while the lens cell holder 19 remains fixed in position. In lieu of positioning the spring 37 between the housing enclosure 12 and the lens housing 24, the spring 37 may alternatively be positioned in the gap 'G' that is defined between the proximal end of the lens cell holder 19 and the flange 31 of the eyepiece housing 24.

The retaining ring 16 of the optical device 10 is provided for mounting the lens cell holder 19 and the eyepiece lens assembly 14 to the housing enclosure 12. The retaining ring 16 of the optical device 10 may also be referred to hereinafter as a retainer. The retaining ring 16 has an L-shaped body in cross-section. Mechanical threads 41 are provided on the interior surface of the distal end of the retaining ring 16 for engaging with the mechanical threads 23 on the flange 13 of the housing enclosure 12. A flange 39, which depends from the proximal end of the retaining ring 16, projects inwardly in a radial direction toward the central axis of the optical device 12. An O-ring 43 is mounted in a circumferential recess that is formed on the flange 39 of the retaining ring 16. The O-ring 43 is compressed between the flange 39 of the retaining ring 16 and the flange 21 of the lens cell holder 19. The O-ring 43 limits the entrance of contaminants into the interior of the housing enclosure 12.

The diopter focus ring 18 of the optical device 10 is provided for adjusting the axial position of the lens assembly 14 relative to the housing enclosure 12. The diopter focus ring 18 has a cylindrical body. Mechanical threads are provided on the interior surface of the diopter focus ring 18 for engaging with mechanical threads 27 on the exterior facing surface of the lens cell holder 19. A flange 29 is defined on the proximal interior end of the diopter focus ring 18 for abutting against the flange 31 of the lens housing 24. A projection 45 (see FIG. 1) extends from the exterior surface of the diopter focus ring 18 for abutting against flanges on the diopter stop ring 20, as will be described hereinafter.

The diopter stop ring 20 of the optical device 10 is fixed to the retaining ring 16 and is configured to limit rotation of the diopter focus ring 18 in both clockwise and counterclockwise directions. The diopter stop ring 20 is fixedly positioned on the outer circumference of the distal end of the retaining ring 16. The interior surface of the stop ring 20 does not include mechanical threads, however, the stop ring 20 could be modified to incorporate mechanical threads.

The diopter stop ring 20 has a substantially cylindrical body including two projections 22a and 22b that extend from the proximal end of the body. The projections 22a and 22b extend axially in a proximal direction (i.e., away from the housing enclosure 12). The projections 22a and 22b interact with the projection 45 of the diopter focus ring 18 to limit rotation of the focus ring 18. In other words, the projections 22a and 22b are positive rotational stops for the focus ring 18. The projection 45 of the focus ring 18 can rotate less than 180 degrees between the projections 22a and 22b. The projection 45 of the focus ring 18 can not rotate beyond either of the projections 22a or 22b.

The diopter stop ring 20 is substantially prevented from rotating on the surface of the retaining ring 16. More specifically, the projection 22b is separated into two detached sections that are separable from each other. The stop ring 20 may be thought of as a split ring having a circumference that is non-continuous. The detached sections of the projection 22b are mounted together by a fastener 47. The fastener 47 is configured to clamp the detached sections of the projection 22b together, thereby creating a high force of friction between the interior surface of the clamped stop ring 20 and the exterior surface of the retaining ring 16. This high force of friction prevents the stop ring 20 from rotating on the surface of the retaining ring 16.

Figure 5:
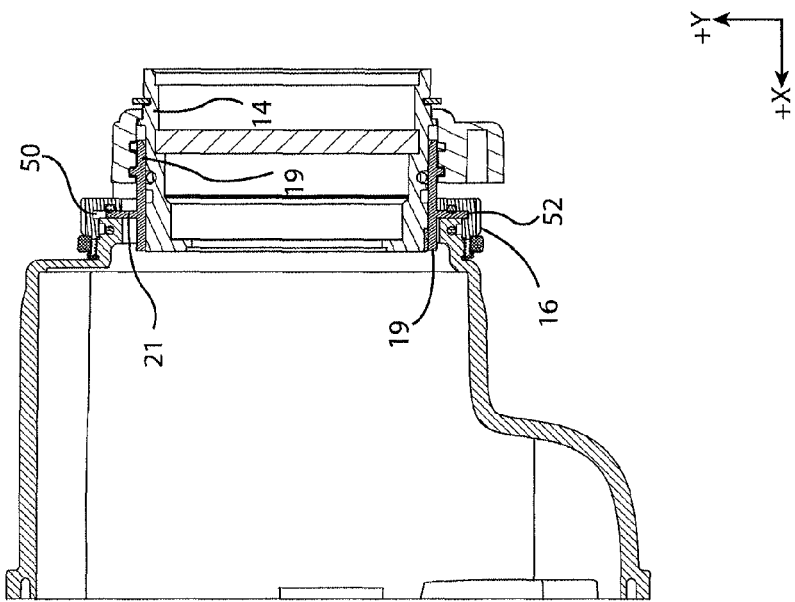
FIG. 5 depicts another cross-sectional view of the optical device of FIG. 3 illustrating the lens assembly at its lower-most radial position.
Figure 4:
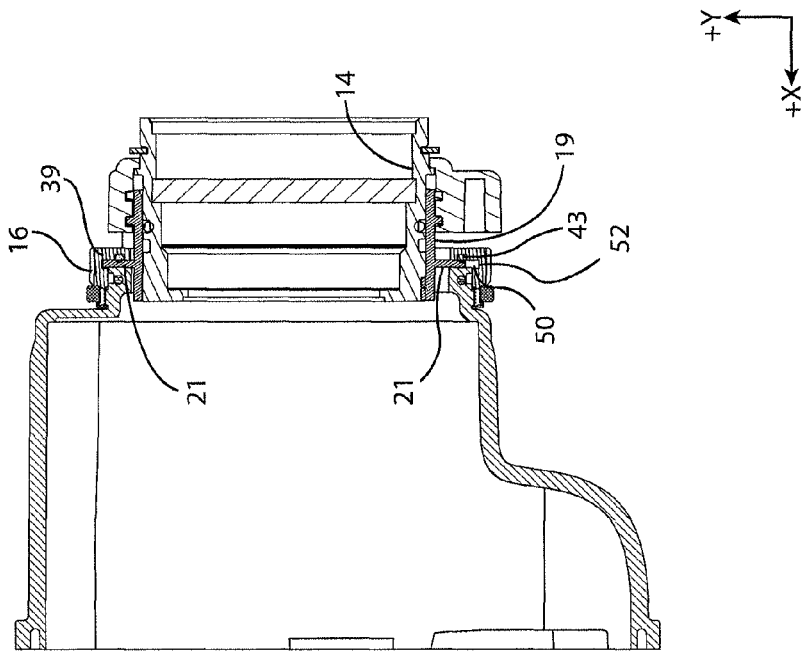
FIG. 4 depicts another cross-sectional view of the optical device of FIG. 3 illustrating the lens assembly at its top-most radial position.

FIGS. 4 and 5 depict line of sight adjustment for the optical device 10 of FIGS. 1-3. The line of sight adjustment is typically performed during assembly of the optical device 10 and is not performed by an end-user of the optical device 10. As shown in FIGS. 4 and 5, prior to clamping the retaining ring 16 against the flange 21 of the lens cell holder 19, the radial position of the lens assembly 14 may be adjusted to achieve a desired line-of-sight for the optical device 10. To accommodate radial adjustment of the lens assembly 14, a circumferential gap 50 is provided between the radial outermost surface of the flange 21 and the interior surface 52 of the retaining ring 16. The circumferential gap 50 may also be referred to herein as a radial space or a radial gap. The circumferential gap 50 is large enough to permit adjustment of the radial position of the lens cell holder 19 and the lens assembly 14 that is attached to the lens cell holder 19. FIGS. 4 and 5 depict the lens assembly 14 at its top-most and bottom-most extreme radial positions, respectively According to one exemplary method of adjusting the line of sight of the optical device 10, prior to clamping the lens cell holder 19 to the flange 13 of the housing enclosure 12 using the retaining ring 16, the radial position of the lens assembly 14 is adjusted to achieve a predetermined line of sight requirement. The radial adjustment process may be manual or automated. FIGS. 4 and 5 depict extreme radial positions of the lens assembly 14. Once the predetermined line of sight requirement is achieved, the lens cell holder 19 is then ready to be clamped to the flange 13 of the housing enclosure 12 using the retaining ring 16. To clamp the lens cell holder 19 and the lens assembly 14 to the housing enclosure 12, the retaining ring 16 is threaded onto the mechanical threads 23 of the housing enclosure 12. As the retaining ring 16 is threaded onto the housing enclosure 12, the flange 39 of the retaining ring 16 compresses the flange 21 of the lens cell holder 19 against the flange 13 of the housing enclosure 12, thereby captivating the lens cell holder 19 to the housing enclosure 12 and compressing the O-ring 43.

FIGS. 4 and 5 depict focus adjustment of the optical device 10 of FIGS. 1-3. It should be understood that translating the lens assembly 14 with respect to the housing enclosure 12 adjusts the focus of the optical device 10. The focus adjustment is typically performed by an end-user of the optical device 10. In use, starting from the position shown in FIG. 6, clockwise rotation (see clockwise directional arrow in FIG. 1) of the focus ring 18 on the mechanical threads 27 of the lens cell holder 19 causes the flange 29 of the focus ring 18 to bear on the flange 31 and translate the eyepiece lens assembly 14 in a distal direction (i.e., toward the housing enclosure 12) against the force of the spring 37. The focus ring 18 is rotated in the clockwise direction until the eyepiece lens assembly 14 reaches the position that is shown in FIG. 7 at which time the projection 45 of the focus ring 18 bears on the projection 22b of the stop ring 20 (see FIG. 1) to prevent further clockwise rotation. Also, as shown in FIG. 7, the distal end of the focus ring 18 bears on the proximal end of the retaining ring 16 to prevent further clockwise rotation of the focus ring 18.

Figure 6:
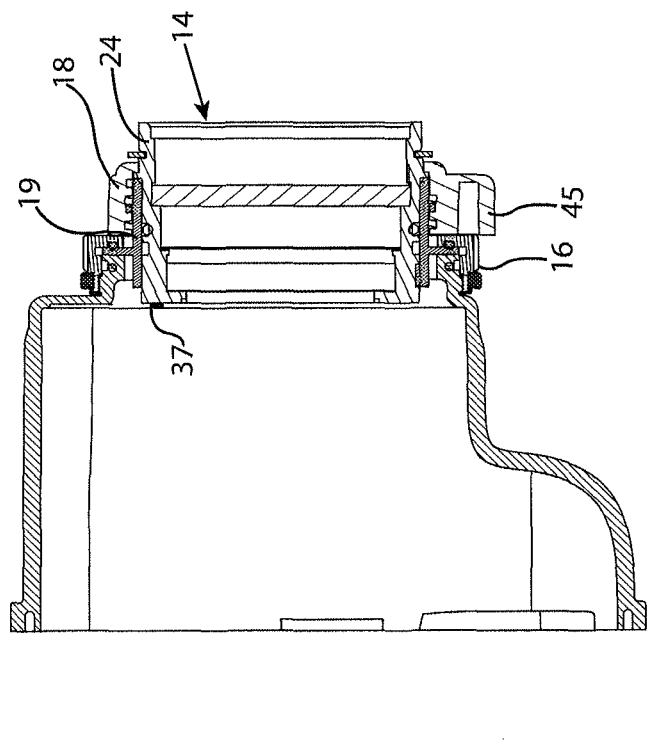
FIG. 6 depicts another cross-sectional view of the optical device of FIG. 3 illustrating the lens assembly in an extended axial position.
Figure 7:
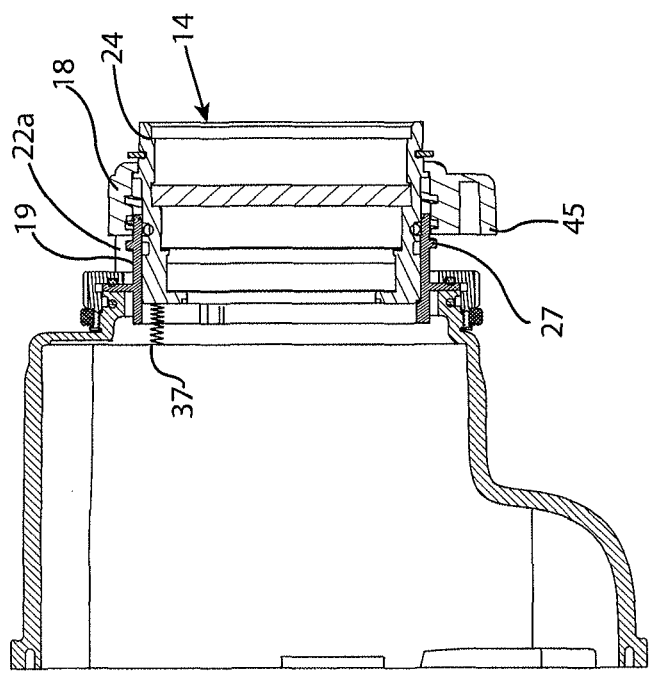
FIG. 7 depicts another cross-sectional view of the optical device of FIG. 3 illustrating the lens assembly in a retracted axial position.

Conversely, starting from the position shown in FIG. 7, counterclockwise rotation of the focus ring 18 on the mechanical threads 27 of the lens cell holder 19 causes the compression spring 37 to expand and translate the eyepiece lens assembly 14 in a proximal direction (i.e., away from the housing enclosure 12) along the x-axis toward the position that is shown in FIG. 6. The focus ring 18 may be rotated in the counterclockwise direction until the eyepiece lens assembly 14 reaches the position that is shown in FIG. 6 at which time the projection 45 of the focus ring 18 bears on the projection 22a of the stop ring 20 to prevent further counterclockwise rotation of the focus ring 18.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

What is claimed:

1. An optical device comprising:
    a housing enclosure having an inner surface and a housing flange extending outward from the inner surface;
    a lens cell holder including a body defining an outer surface and a lens cell holder flange extending outward from the outer surface, the lens cell holder flange positioned between the housing flange and a retainer, the retainer surrounding and connected in direct physical contact with the housing flange to prevent radial movement of the lens cell holder in an assembled configuration of the optical device in which the retainer is fixed to the housing flange;
    a lens assembly having one or more lenses mounted to the lens cell holder, the lens assembly configured to translate in an axial direction with respect to the housing enclosure and the lens cell holder; and
    a radial space defined between the outer surface of the lens cell holder and the inner surface of the housing enclosure, the radial space sized to accommodate adjustment of the lens cell holder and the lens assembly in a radial direction with respect to the housing enclosure,
    wherein, in an adjustment configuration of the optical device for adjusting a line of sight of the optical device, the lens cell holder and the lens assembly are movable in the radial direction within the radial space while the lens cell holder flange is positioned against the housing flange of the housing enclosure and the retainer is not fixed to the housing flange, and
    wherein the line of sight of the optical device is established in the assembled configuration of the optical device in which the retainer is fixed to the housing flange.

2. The optical device of claim 1 further comprising an O-ring positioned between the lens cell holder and the lens assembly that is configured to limit the entrance of contaminants into the housing enclosure.

3. The optical device of claim 1 further comprising a diopter focus ring for adjusting the axial position of the lens assembly relative to the housing enclosure.

4. The optical device of claim 1 further comprising an O-ring positioned between the retainer and the lens cell holder that is configured to limit the entrance of contaminants into the housing enclosure.

5. The optical device of claim 1, wherein the optical device is a monocular.

6. The optical device of claim 1, wherein the optical device is a night-vision monocular.

7. The optical device of claim 1, wherein the flange of the lens cell holder extends radially from a body of the lens cell holder.

8. The optical device of claim 3, wherein the diopter focus ring includes a flange that bears on a flange of the lens assembly for translating the lens assembly relative to the housing enclosure in an axial direction upon rotation of the diopter focus ring.

9. The optical device of claim 3, wherein the diopter focus ring is rotatably mounted to the lens cell holder.

10. The optical device of claim 3 further comprising a diopter stop ring that is configured to limit rotation of the diopter focus ring in both clockwise and counterclockwise directions.

11. The optical device of claim 8, wherein the lens assembly is biased by a spring in a direction away from the housing enclosure.

12. The optical device of claim 10 further comprising at least one projection on the diopter stop ring that interacts with a projection on the diopter focus ring to limit rotation of the diopter focus ring.

13. The optical device of claim 10, wherein the diopter stop ring is non-rotatably positioned on the retainer.

* * * * *